United States Patent
Kuo et al.

(10) Patent No.: US 7,885,357 B1
(45) Date of Patent: Feb. 8, 2011

(54) APPARATUS FOR SIGNAL DETECTION TO ENHANCE PERFORMANCE OF A RECEIVER AND METHOD THEREFOR

(75) Inventors: Chia-Wei Kuo, Taipei (TW); Cheng-Ting Wu, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 597 days.

(21) Appl. No.: 12/007,317

(22) Filed: Jan. 9, 2008

(51) Int. Cl.
*H03K 9/00* (2006.01)
(52) U.S. Cl. .................................. 375/316; 375/350
(58) Field of Classification Search .................. 375/316, 375/343, 350
See application file for complete search history.

(56) References Cited

U.S. PATENT DOCUMENTS 6,459,888 B1   10/2002  Clark
6,463,107 B1*  10/2002  Lindoff et al. .............. 375/343
2005/0259887 A1* 11/2005  Hellman ..................... 382/260

* cited by examiner

*Primary Examiner*—Emmanuel Bayard
(74) *Attorney, Agent, or Firm*—Rabin & Berdo, P.C.

(57) ABSTRACT

An apparatus for signal detection to enhance performance of a receiver and method therefor. The signal detection unit provides at least three filtered output signals with different bandwidths, wherein at least one of output signals is generated by phase derotation and filtering. The three filtered digital signals are provided for a subsequent stage, such as a digital signal processor, to perform further operations of a receiver in different modes, such as a synchronization mode where the receiver synchronizes with a base station or a normal mode where transmitted data contained in the received signal is extracted. The signal detection unit includes a memory buffer with a reduced memory size for preparation of the three filtered digital signals efficiently. The circuit complexity and size can be dramatically improved and the performance of the receiver can be enhanced by the signal detection unit.

23 Claims, 2 Drawing Sheets

APPARATUS FOR SIGNAL DETECTION TO ENHANCE PERFORMANCE OF A RECEIVER AND METHOD THEREFOR

BACKGROUND OF THE INVENTION

1. Field of the Invention

The invention relates in general to an apparatus and a method for signal detection, and more particularly to an apparatus for signal detection with phase rotation and filtering functionality to enhance performance of a receiver and a method therefor.

2. Description of the Related Art

In a typical wireless communication system, a receiver performs demodulation on a received signal to acquire data contained in the received signal. The receiver typically is required for performing an initial synchronization operation to synchronize the receiver with a transmitter with respect to the received signal. For example, in a communications system using time division multiple access (TDMA) technology, such as a global system for mobile communications (GSM) system, the received signal is time-division-multiplexed. After the synchronization operation is completed, the receiver enters a normal mode where the receiver can perform demodulation to extract data contained in the received signal.

Before synchronization and demodulation, the received signal is initially processed and down-converted to a baseband signal with respect to a specific channel. In addition, the baseband signal is further converted to an in-phase component I and a quadrature component Q (I/Q components) of the baseband signal for further processing. The I/Q components of the baseband signal, which includes a tone of a known frequency, e.g. a pilot tone of 67.7 kHz in GSM system, is further down-converted to a tone for the receiver to lock onto in order to perform the synchronization.

A wireless communication device, e.g. a mobile station, detects the single tone by applying a digital signal processor equipped in the mobile phone to directly process the I/Q components of the baseband signal with respect to a selected channel. This approach is straightforward to achieve the synchronization operation with a hardware component. However, the digital signal processor needs to perform complicated computation in order to detect the single tone while possibly requested for services by many other components of the mobile phone to perform other operations. Accordingly, the loading and power consumption of the digital signal processor would be increased, degrading performance of the mobile station. Thus, it is desirable to have an approach to signal detection, especially for single tone detection, to resolve this problem and enhance the performance.

SUMMARY OF THE INVENTION

It is therefore an object of the invention to provide a signal detection unit for providing at least three filtered output signals with different bandwidths, wherein at least one of the three filtered output signal is generated by phase derotation and filtering. The three filtered digital signals are provided for a subsequent stage, such as a digital signal processor, to perform further operations of a receiver in different modes, such as a synchronization mode where the receiver synchronizes with a base station or a normal mode where transmitted data contained in the received signal is extracted. The signal detection unit includes a memory with a reduced memory size for preparation of the three filtered digital signals efficiently.

The circuit complexity and size can be dramatically improved and the performance of the receiver can be enhanced by the signal detection unit.

The invention achieves the above-identified object by providing a apparatus for signal detection in a receiver, wherein a digital signal indicating a plurality of sequential data sets is provided in the receiver in response to a signal received from a communication link, each data sets indicating a first component and a second component representing the digital signal. The apparatus includes a sequence generator, a memory, a phase rotation circuit, and a digital filtering unit. The sequence generator is used for generating a sequence signal indicating respective sequential phases of the data sets indicated by the digital signal. The memory is used to buffer an amount of data indicating the digital signal and the sequence signal to provide a buffered digital signal and a buffered sequence signal. The phase rotation circuit, coupled to the memory to receive the buffered digital signal and the buffered sequence signal from the memory, is employed to derotate the buffered digital signal according to the buffered sequence signal to produce a derotated digital signal. The digital filtering unit, coupled to the phase rotation circuit and the memory, is used for filtering the derotated digital signal to generate a first filtered output signal with a first bandwidth, for filtering the buffered digital signal to generate a second filtered output signal with a second bandwidth, and for filtering the buffered digital signal to generate a third filtered output signal with a third bandwidth, wherein the second bandwidth and the third bandwidth are different.

According to another object of the invention, a communication receiving apparatus is provided, including the signal detection unit, a pre-processing unit, a signal processing unit. The pre-processing unit is operable to provide a digital signal indicating a plurality of sequential data sets in response to a signal received from a communication link, each data sets indicating a first component and a second component representing the digital signal, wherein the digital signal is a baseband signal. The signal processing unit detects a pilot signal according to the first filtered output signal and the second filtered output signal, and the signal processing unit detects at least a signal other than the pilot signal according to the second filtered output signal and the third filtered output signal.

According to another object of the invention, a method for signal detection in a receiver is provided, wherein a digital signal indicating a plurality of sequential data sets is provided in the receiver in response to a signal received from a communication link, each data sets indicating a first component and a second component representing the digital signal. The method includes the following steps. A sequence signal is generated, indicating respective sequential phases of the data sets indicated by the digital signal. An amount of data indicating the digital signal and the sequence signal are buffered in a memory to provide a buffered digital signal and a buffered sequence signal. In response to the buffered digital signal and the buffered sequence signal from the memory, the buffered digital signal is derotated according to the buffered sequence signal to produce a derotated digital signal. The derotated digital signal is digitally filtered to generate a first filtered output signal with a first bandwidth. In response to the buffered digital signal from the memory, the buffered digital signal is digitally filtered to generate a second filtered output signal with a second bandwidth. In response to the buffered digital signal from the memory, the buffered digital signal is digitally filtered to generate a third filtered output signal with a third bandwidth, wherein the second bandwidth and third bandwidth are different.

Other objects, features, and advantages of the invention will become apparent from the following detailed description of the preferred but non-limiting embodiments. The following description is made with reference to the accompanying drawings.

DETAILED DESCRIPTION OF THE INVENTION

According to a preferred embodiment of the invention, a signal detection unit is provided to generate at least three filtered digital signals with different bandwidths in response to a digital signal, e.g. an in-phase component and a quadrature component of a baseband signal derived from a signal received by a receiver, wherein one of the filtered digital signals is generated by phase derotation and filtering. The three filtered digital signals are provided for a subsequent stage, such as a digital signal processor, to perform further operations in order to achieve the requirements for the receiver to operate in different modes, such as a synchronization mode where the receiver synchronizes with a base station with respect to the received signal or a normal mode where transmitted data contained in the received signal is extracted and processed. The signal detection unit includes a memory buffer with a reduced memory size for preparation of the three filtered digital signals efficiently. Therefore, the loading and power consumption of the digital signal processor can be reduced, providing flexibility of operations to the digital signal processor and improving the performance of the receiver.

Figure 1:
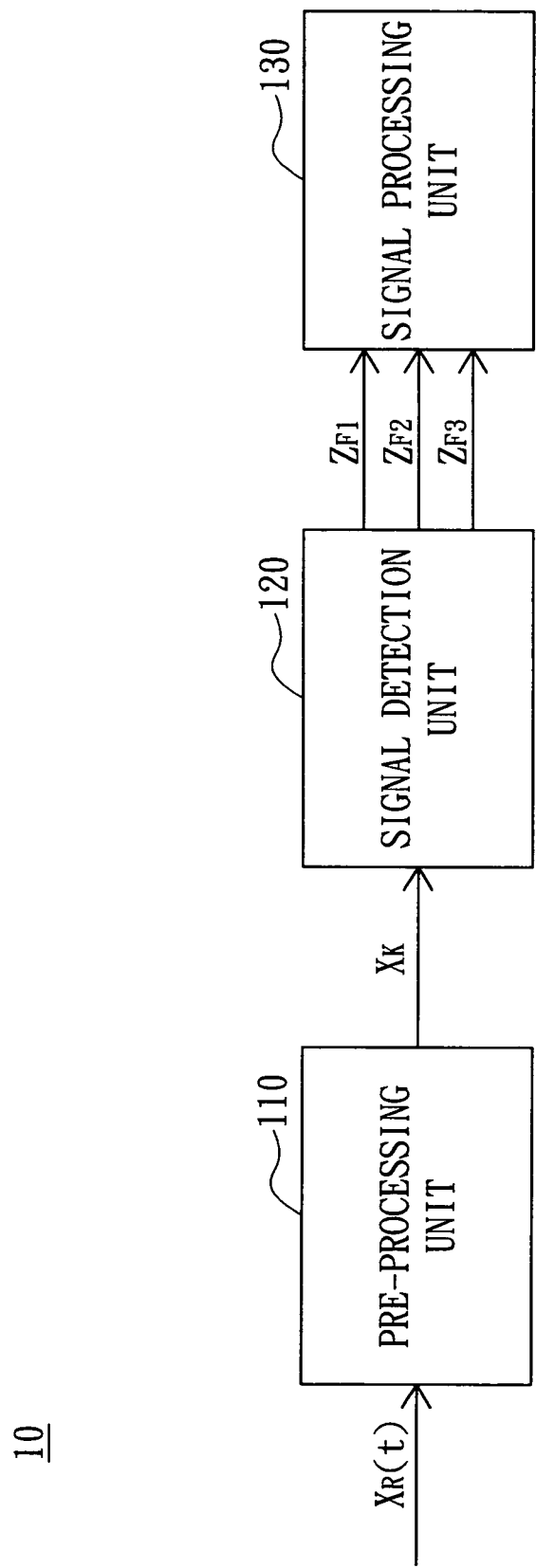
FIG. 1 illustrates a receiver with a signal detection unit is shown according to an embodiment of the invention.

Referring to FIG. 1, a receiver with a signal detection unit is shown according to the invention. The receiver 10 includes a pre-processing unit 110, a signal detection unit 120, and a signal processing unit 130. The receiver 10 is included in a communication device, for example, a mobile station in a wireless digital communication system, such as a GSM system, a general packet radio service (GPRS), or an enhanced data GSM environment (EDGE). The pre-processing unit 110 is operable to provide a digital signal in response to a signal $x_R(t)$ received via a communication link, e.g. a wireless communication link or a wired one such as a fiber or cable. For example, the pre-processing unit 110 includes a radio frequency unit for receiving a wireless signal from a base station via a wireless link provided by a GSM system and outputting a baseband digital signal according to the received signal. In the following, the digital signal represents a baseband signal with respect to a selected channel included in the received signal $x_R(t)$, for example, which is time-division-multiplexed in a GSM system. The pre-processing unit 110, preferably, provides the digital signal in terms of symbols of in-phase and quadrature components by sampling an in-phase component and a quadrature component of the baseband signal at a specific sampling rate, for example, about 540 kb/sec. As in FIG. 1, $X_k$ denotes the digital signal in terms of pairs of sampled in-phase and quadrature components of the baseband signal, denoted by $(I_k, Q_k)$. Those skilled in this art would recognize that the pre-processing unit 110 can be implemented by using devices, for example, bandpass filters, mixers, amplifiers, and analog-to-digital converters, and decimation filters, to derive the digital signal $X_k=(I_k, Q_k)$ from the received signal $x_R(t)$. In general, the digital signal $X_k$ indicates a plurality of sequential data sets, each data set indicating an in-phase component and a quadrature component of the digital signal, wherein the digital signal is a baseband signal.

The signal detection unit 120 generates at least three filtered output signals $Z_{F1}$, $Z_{F2}$, and $Z_{F3}$ with different bandwidths in response to the digital signal $X_k$, where one of the filtered output signals, e.g. a first filtered output signal $Z_{F1}$, is generated after phase derotation of the digital signal $X_k$ and filtering. The signal detection unit 120 generates a first filtered output signal $Z_{F1}$ with a first bandwidth, a second filtered output signal $Z_{F2}$ with a second bandwidth, and a third filtered output signal $Z_{F3}$ with a third bandwidth, preferably, in terms of symbols of in-phase and quadrature components. The second bandwidth and the third bandwidth are wider than the first bandwidth, for example. When the receiver 10 is in a first mode, such as the synchronization mode, the signal detection unit 120 provides the signal processing unit 130 with the first filtered output signal $Z_{F1}$ and the second filtered output signal $Z_{F2}$ for detection of a pilot signal, wherein the first and second bandwidths can be about 30 kHz and 90 kHz respectively, for example. When the receiver 10 is in a second mode, such as the normal mode, the signal detection unit 120 provides the signal processing unit 130 with the second filtered output signal $Z_{F2}$ and the third filtered output signal $Z_{F3}$ for detection of at least a signal other than the pilot signal, for example, for extracting transmitted data contained in the received signal $x_R(t)$ with respect to a selected channel, wherein the second and third bandwidths can be about 170 kHz and 120 kHz respectively, for example.

The signal processing unit 130, in either the synchronization or normal mode, receives two corresponding filtered output signals for further processing. For example, where frequency correction channel (FCCH) and synchronization channel (SCH) carry information allowing the mobile station to acquire and stay synchronized with a base station in a GSM system, a mobile station in the synchronization mode can apply two filtered output signals, for example, $Z_{F1}$ and $Z_{F2}$, with respect to these channels for detection of a pilot signal, such as a pilot tone of 67.7 kHz in a GSM system, where one of the two filtered output signals is generated after phase derotation and filtering. The signal processing unit 130 can be designed or programmed to perform operations on the two filtered output signals according to specification of GSM to detect the pilot signal and perform operations of synchronization according to the pilot signal. After synchronization, the mobile station enters the normal mode and can supply the signal processing unit 130 with two filtered output signals, e.g. $Z_{F2}$ and $Z_{F3}$, with respect to a traffic channel (TCH), which is intended to carry user information (i.e. voice or data) in the GSM system. The signal processing unit 130 can be designed or programmed to perform operations on the two filtered output signals according to specification of GSM to detect the user information and perform operations on the user information detected. The signal processing unit 130 can be implemented by a processing unit such as a microprocessor, a digital signal processor (DSP), an application specific integrated circuits (ASIC), or a system-on-chip (SOC).

Figure 2:
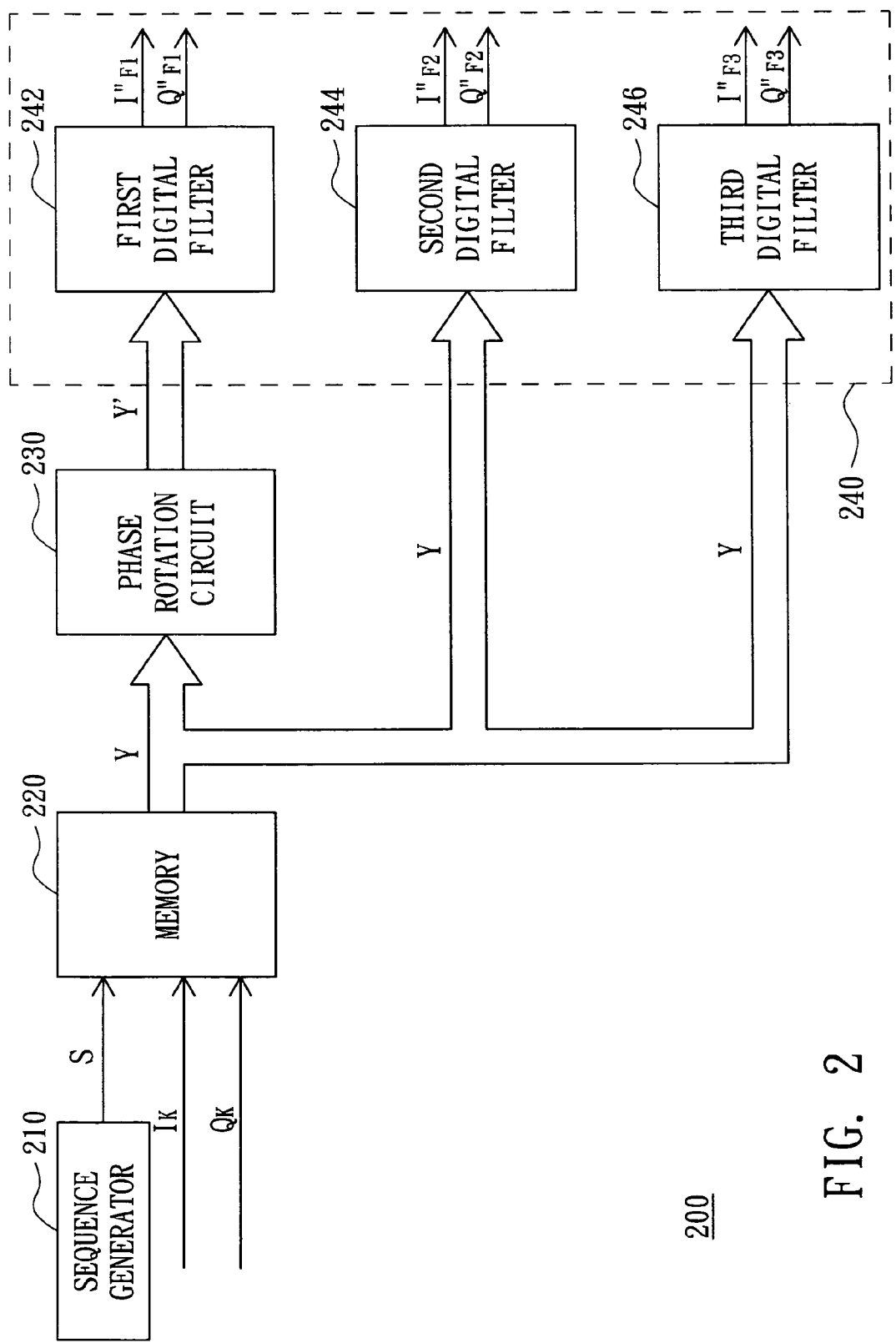
FIG. 2 is a block diagram illustrating a signal detection unit according to a preferred embodiment of the invention.

Referring to FIG. 2, a signal detection unit, indicated by 120 in FIG. 1, is illustrated according to a preferred embodiment of the invention. In FIG. 2, the signal detection unit 200 includes a sequence generator 210, a memory 220, a phase rotation circuit 230, and a digital filtering unit 240. The sequence generator 210, in response to the digital signal $X_k$, for generating a sequence signal, denoted by S, indicating respective sequential phases of the in-phase and quadrature components, $(I_k, Q_k)$, indicated by the digital signal $X_k$. The memory 220, such as a RAM-based memory component, is used for buffering an amount of data indicating the digital signal $X_k$ and the corresponding sequence signal S to provide a buffered digital signal and a buffered sequence signal. The phase rotation circuit 230, coupled to the memory 220 to receive the buffered digital signal and the buffered sequence signal from the memory 220, is used for derotating the buffered digital signal according to the buffered sequence signal to produce a derotated digital signal, denoted by Y'. The digital filtering unit 240, coupled to the phase rotation circuit 230 and the memory 220, is employed to filter the derotated digital signal Y' to generate a first filtered output signal $Z_{F1}$ with a first bandwidth, for filtering the buffered digital signal to generate a second filtered output signal $Z_{F2}$ with a second bandwidth, and for filtering the buffered digital signal to generate a third filtered output signal $Z_{F3}$ with a third bandwidth.

In certain condition of a digital baseband receiver for GSM, GSPR, or EDGE, such as in a synchronization mode, for example, the signal detection unit 200 can be regarded as an apparatus to down-convert the receiving complex signal $X_k$ indicated by a sequence of sampled in-phase and quadrature components ($I_k$, $Q_k$), or simply called I/Q signals, to a single tone for performance improvement by rejecting adjacent interference. In a first mode, such as the synchronization mode, the signal detection unit 200 provides two filtered output signals, for example, $Z_{F1}$ and $Z_{F2}$, for detection of a single tone, such as a pilot signal in the GSM system, wherein $Z_{F1}$ is generated by phase derotation and filtering with a first bandwidth and $Z_{F2}$ is generated by filtering with a second bandwidth, without phase derotation. The down-conversion process is realized by derotating the complex digital signal $X_k$ according to its phase. A pair of I/Q signals, i.e. a sampled in-phase component and a sampled quadrature component ($I_k$, $Q_k$), has one of different sequential phases in a I/Q plane due to the characteristics of the digital signal $X_k$ in this mode.

For example, eight different sequential phases happen in the pairs of I/Q signals sequentially if the I/Q signals are provided after sampling the baseband signal at a sampling rate of about 540 kb/sec in the synchronization mode for a GSM system. By determining which section of the I/Q plane a pair of I/Q signals ($I_k$, $Q_k$) lie on, the phase rotation circuit 230 performs phase derotation on the I/Q signals. In order to improve the circuit efficiency and reduce complexity, the receiving I/Q signals and corresponding "time-stamps" indicated by the sequence signal S from the sequence generator 210 are fed into the memory 220, wherein a pair of I/Q signals are associated with a time-stamp indicating one of the different phases. The phase rotation circuit 230 can receive the I/Q signals and corresponding "time-stamps" from the memory 220 and can generate de-rotated I/Q signals according to the "time-stamps" for each pair of I/Q signals. Following the example of I/Q signals with eight different sequential phases, the "time-stamps" can be encoded as a repeated sequence of number, for example, 0, 1, 2, 3, 4, 5, 6, and 7 to represent the eight sequential phases. In this way, the phase rotation circuit 230 can be implemented by combinational logic circuitry and the sequence generator 210 can be implemented by modulus eight of a free running counter, for example. In one embodiment, the phase rotation circuit 230 derotates a complex digital signal $X_k$, i.e. a pair of $I_k$ and $Q_k$, according to their corresponding time-stamp $S_k$ to generate a derotated complex signal $X'_k$, i.e. a pair of $I'_k$ and $Q'_k$, wherein the pair of ($I_k$, $Q_k$) are determined to lie on a quadrant of a I/Q plane according to the corresponding time-stamp $S_k$, and ($I'_k$, $Q'_k$)=($I_k$, $Q_k$) if $S_k$=0 or 1 for quadrant I;
($I'_k$, $Q'_k$)=($Q_k$, $-I_k$) if $S_k$=2 or 3 for quadrant II;
($I'_k$, $Q'_k$)=($-I_k$, $-Q_k$) if $S_k$=4 or 5 for quadrant III; and
($I'_k$, $Q'_k$)=($-Q_k$, $I_k$) if $S_k$=6 or 7 for quadrant IV.

One the other hand, a set of derotated I/Q signals and a set of non-derotated I/Q signals are required to be prepared at the same time for the digital filtering unit 240 to perform digital filtering. The memory size of the memory 220 is thus determined based on characteristics of the digital filtering unit 240. For example, the digital filtering unit 240 in FIG. 2 includes a first digital filter 242, a second digital filter 244, and a third digital filter 246. The three digital filters are matched filters, such as finite impulse response (FIR) matched filters, and may be low-pass filters, high-pass filters, or bandpass filters, depending on the application of the signal detection unit 200. In one example, the first digital filter 242, second digital filter 244, and third digital filter 246 are all low-pass filters with bandwidths of about 30 kHz, 90 kHz, and 110 kHz, respectively. In another example, the first digital filter 242, second digital filter 244 and third digital filter 246 are low-pass filters with bandwidths of about 30 kHz, 70 kHz, and 120 kHz, respectively. It is assumed that each of the digital filters requires the feeding of a specific number of pairs of I/Q sequential signals at the same time, where the specific number is called a tap number, denoted by T, which is a parameter for a digital filter. Thus, the memory 220 is required for storing at least two times T entries, where T entries for I signals and T entries for Q signals, and the actual memory size of the memory 220 is determined by the data-width of the I/Q signals and the sequence signal. As exemplified above, the sequence signal S indicates a different sequential phases regarded as time-stamps encoded by a repeated sequence of numbers 0, 1, 2, 3, 4, 5, 6, and 7, and each pair of I/Q signals are associated with a time-stamp, that is, one of the sequence of numbers. Therefore, the memory 220 includes at least 2T outputs for providing a set of buffered data signals, denoted by Y, indicating a set of buffered I/Q signals and corresponding time-stamps in parallel. Symbolically, the set of buffered data signals Y represents $\{X_0, X_1, \ldots, X_k, \ldots, X_{T-1}, S_0, S_1, \ldots, S_k, \ldots, S_{T-1}\}$, where $X_k=I_k+jQ_k$ and T denotes the tap number.

Referring to FIG. 2, the buffered data signals Y are applied to the phase rotation circuit 230 and the second digital filter 244 and third digital filter 246 of the digital filtering unit 240. The phase rotation circuit 230 receives the set of buffered data signals Y in parallel and generates a set of de-rotated I/Q signals in parallel, denoted by Y', according to the set of buffered data signals Y. The set of de-rotated I/Q signals Y', symbolically, represents $Y'=\{X'_0, X'_1, \ldots, X'_k, \ldots, X'_{T-1}\}$, wherein $X'_k=I'_k+jQ'_k$, and T denotes the tap number. The de-rotated digital signal $X'_k$ is determined according to $X_k$ and $S_k$, as exemplified in the above embodiment of the phase rotation circuit 230. The digital filtering unit 240 receives a set of de-rotated I/Q signals Y' from the phase rotation circuit 230 and a set of non-derotated I/Q signals included in Y from the memory 220. Since the buffered data signals Y include "time-stamps", the time-stamps in the buffered data signals Y may be discarded and the time-stamp-discarded buffered data signals are used by the second digital filter 244 and third digital filter 246 to perform digital filtering. The first digital filter 242 performs digital filtering according the set of de-rotated I/Q signals to generate a first filtered output signal $Z_{F1}$ with a first bandwidth, where $Z_{F1}=I''_{F1}+jQ''_{F1}$. The second digital filter 244 performs digital filtering according the set of non-derotated I/Q signals to generate a second filtered output signal $Z_{F2}$ with a first bandwidth, where $Z_F=I''_{F2}+jQ_{F2}$. The third digital filter 246 performs digital filtering according the set of non-derotated I/Q signals to generate a third filtered output signal $Z_{F3}$ with a first bandwidth, where $Z_{F3}=I''_{F3}+jQ''_{F3}$.

Since the digital filtering unit 240 are provided with the set of de-rotated I/Q signals and the set of non-derotated I/Q signals, the first digital filter 242, second digital filter 244, third digital filter 246 can be implemented with a simplified structure. Those skilled in the art would recognize that an FIR filter is usually implemented by using a series of delay devices, multipliers, and adders to create the filter's output, and the output of the filter at a time is a summation of all delayed samples multiplied by coefficients. A digital filter, for example, can be implemented by a FIR filter with a number of inputs for feeding a set of I/Q signals from the memory 220 into the multipliers of the FIR filter in order to create the FIR filter's output, instead of using the delay devices, which can be implemented by a buffer, to provide delayed sampled. In this way, the digital filters included in the digital filtering unit 240 can be implemented with a FIR filter including multipliers and adders to perform a weighted sum of a set of I/Q signals, thus reducing the complexity of the digital filtering unit 240. The tap number for a digital filter affects 3 dB attenuation performance of the digital filter. For example, a tap number T of 21 or 31 is taken. The total memory size of the memory 220 for providing the set of buffered data signals Y can be determined and the circuitry for the digital filtering unit 240 can be designed according to the tap number.

When the receiver 10 is in a second mode, such as the normal mode, the signal detection unit 200 provides the signal processing unit 130 with the second filtered output signal $Z_{F2}$ and the third filtered output signal $Z_{F3}$ for detection of at least a signal other than the pilot signal, for example, for extracting transmitted data contained in the received signal $x_R(t)$ with respect to a selected channel. In different modes, such as the first mode and the second mode, the signal processing unit 130 can utilize at least two corresponding filtered output signals, with at least one of them as a reference point for detection performance. For example, in the synchronization mode, the signal detection unit 200 provide the signal processing unit 130 with the first and second filtered output signals $Z_{F1}$ and $Z_{F2}$, and the signal processing unit 130 can compare the two signals and use the second filtered output signal $Z_{F2}$, for example, as a reference point for detection performance with respect to the first filtered output signal $Z_{F1}$. In the normal mode, the signal detection unit 200 provide the signal processing unit 130 with the second and third filtered output signals $Z_{F2}$ and $Z_{F3}$, and the signal processing unit 130 can compare the two signals and use the third filtered output signal $Z_{F3}$, for example, as a reference point for detection performance with respect to the first filtered output signal $Z_{F2}$.

As indicated in FIG. 1, at least three filtered output signals are provided and the subsequent stage, such as the signal processing unit 130, can use at least two of the three filtered output signals or for further operations in different operating mode, such as the above synchronization mode and the normal mode. In another embodiment, the signal detection unit 200 can further include a selector, such as a multiplexing device, for selecting two of the three filtered output signals as two input signals of the signal processing unit 130, according to a selection signal indicating the operating mode. Moreover, in the above embodiments, some of the signals are in terms of complex signal representation and the digital filters, such as the first digital filter 242, second digital filter 244, and third digital filter 246, are exemplified with complex digital filters. Those skilled in the art would recognize and appreciate that the digital filters can be implemented in various ways. For example, a complex digital filter can be implemented by a pair of real digital filters, such as two FIR filters, with one for digitally filtering the sampled in-phase signal and another for digitally filtering the sampled quadrature signal.

Further, a method for signal detection in a receiver is provided according to an embodiment of the invention. The method includes the following steps. In response to a digital signal, a sequence signal is generated indicating respective sequential phases of the data sets indicated by the digital signal, wherein the digital signal indicates a plurality of sequential data sets sampled from a baseband signal provided in the receiver in response to a signal received from a communication link. An amount of data indicating the digital signal and the sequence signal are buffered in a memory to provide a buffered digital signal and a buffered sequence signal. Next, in response to the buffered digital signal and the buffered sequence signal from the memory, the buffered digital signal is derotated according to the buffered sequence signal to produce a derotated digital signal. After that, the derotated digital signal is digitally filtered to generate a first filtered output signal with a first bandwidth. In response to the buffered digital signal from the memory, the buffered digital signal is digitally filtered to generate a second filtered output signal with a second bandwidth. In response to the buffered digital signal from the memory, the buffered digital signal is digitally filtered to generate a third filtered output signal with a third bandwidth. The second bandwidth and third bandwidth are wider than the first bandwidth, for example. In a first mode of the receiver, the first filtered output signal and the second filtered output signal are outputted for detection of a pilot signal. In a second mode of the receiver, the second filtered output signal and the third filtered output signal are outputted for detection of at least a signal other than the pilot signal.

According to the above embodiments and examples of the signal detection unit, the receiver structure, and signal detection method, various advantages can be achieved. First, reduced memory size of the memory 220 is achieved for providing a set of I/Q signals. With very small overhead for the memory for storing the I/Q signals to store the "time stamps", a set of derotated I/Q signals can be generated in parallel by combinational logic circuitry and provided to at least one of the digital filters of the first digital filter 242 in parallel. In addition, a set of non-derotated signals at the same time can be applied to at least two of the digital filters of the first digital filter 242. The digital filters can thus implemented in a simplified structure. Hence, circuit complexity and size can be dramatically improved. Secondly, the signal detection unit provides a subsequent stage with at least three filtered output signals in order to offer flexibility to the subsequent stage, such as a digital signal processor, in signal processing. For example, two modes are exemplified in the above, wherein detection performance judgement can be done with at least one of the filtered output signal.

While the invention has been described by way of examples and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for signal detection in a receiver, wherein a digital signal indicating a plurality of sequential data sets is provided in the receiver in response to a signal received from a communication link, each data sets indicating a first component and a second component representing the digital signal, the apparatus comprising:

a sequence generator for generating a sequence signal indicating respective sequential phases of the data sets indicated by the digital signal;

a memory for buffering an amount of data indicating the digital signal and the sequence signal to provide a buffered digital signal and a buffered sequence signal;

a phase rotation circuit, coupled to the memory to receive the buffered digital signal and the buffered sequence signal from the memory, for derotating the buffered digital signal according to the buffered sequence signal to produce a derotated digital signal; and a digital filtering unit, coupled to the phase rotation circuit and the memory, for filtering the derotated digital signal to generate a first filtered output signal with a first bandwidth, for filtering the buffered digital signal to generate a second filtered output signal with a second bandwidth, and for filtering the buffered digital signal to generate a third filtered output signal with a third bandwidth, wherein the second bandwidth and the third bandwidth are different.

2. The apparatus according to claim 1, wherein the digital filtering unit comprises:
a first digital filter for filtering the derotated digital signal to generate the first filtered output signal with the first bandwidth;
a second digital filter for filtering the buffered digital signal to generate the second filtered output signal with the second bandwidth; and
a third digital filter for filtering the buffered digital signal to generate the third filtered output signal with the third bandwidth.

3. The apparatus according to claim 1, wherein the apparatus is operable in a first mode to provide the first filtered output signal and the second filtered output signal for detection of a pilot signal.

4. The apparatus according to claim 3, wherein the apparatus is operable in a second mode to provide the second filtered output signal and the third filtered output signal for detection of at least a signal other than the pilot signal.

5. The apparatus according to claim 4, wherein the receiver is a wireless receiver, and the pilot signal is for synchronization.

6. The apparatus according to claim 5, wherein the receiver is compliant with global system for mobile communications (GSM).

7. The apparatus according to claim 1, wherein the second bandwidth and the third bandwidth are wider than the first bandwidth.

8. The apparatus according to claim 1, wherein the first component and the second component are an in-phase component and a quadrature component of the digital signal, respectively.

9. A method for signal detection in a receiver, wherein a digital signal indicating a plurality of sequential data sets is provided in the receiver in response to a signal received from a communication link, each data sets indicating a first component and a second component representing the digital signal, the method comprising:
generating a sequence signal indicating respective sequential phases of the data sets indicated by the digital signal;
buffering an amount of data indicating the digital signal and the sequence signal in a memory to provide a buffered digital signal and a buffered sequence signal;
in response to the buffered digital signal and the buffered sequence signal from the memory, derotating the buffered digital signal according to the buffered sequence signal to produce a derotated digital signal; and
digitally filtering the derotated digital signal to generate a first filtered output signal with a first bandwidth;
in response to the buffered digital signal from the memory, digitally filtering the buffered digital signal to generate a second filtered output signal with a second bandwidth; and
in response to the buffered digital signal from the memory, digitally filtering the buffered digital signal to generate a third filtered output signal with a third bandwidth, wherein the second bandwidth and third bandwidth are different.

10. The method according to claim 9, wherein in a first mode of the receiver, providing the first filtered output signal and the second filtered output signal for detection of a pilot signal.

11. The method according to claim 10, wherein in a second mode of the receiver, providing the second filtered output signal and the third filtered output signal for detection of at least a signal other than the pilot signal.

12. The method according to claim 11, wherein the receiver is a wireless receiver, and the pilot signal is for synchronization.

13. The method according to claim 12, wherein the receiver is compliant with global system for mobile communications (GSM).

14. The method according to claim 9, wherein the second bandwidth and the third bandwidth are wider than the first bandwidth.

15. The method according to claim 9, wherein the first component and the second component are an in-phase component and a quadrature component of the digital signal, respectively.

16. A communication receiving apparatus comprising:
a pre-processing unit operable to provide a digital signal indicating a plurality of sequential data sets in response to a signal received from a communication link, each data sets indicating a first component and a second component representing the digital signal, wherein the digital signal is a baseband signal;
a signal detection unit comprising:
a sequence generator for generating a sequence signal indicating respective sequential phases of the data sets indicated by the digital signal;
a memory for buffering an amount of data indicating the digital signal and the sequence signal to provide a buffered digital signal and a buffered sequence signal;
a phase rotation circuit, coupled to the memory to receive the buffered digital signal and the buffered sequence signal from the memory, for derotating the buffered digital signal according to the buffered sequence signal to produce a derotated digital signal; and
a digital filtering unit, coupled to the phase rotation circuit and the memory, for filtering the derotated digital signal to generate a first filtered output signal with a first bandwidth, for filtering the buffered digital signal to generate a second filtered output signal with a second bandwidth, and for filtering the buffered digital signal to generate a third filtered output signal with a third bandwidth;
a signal processing unit, wherein the signal processing unit detects a pilot signal according to the first filtered output signal and the second filtered output signal, and the signal processing unit detects at least a signal other than the pilot signal according to the second filtered output signal and the third filtered output signal.

17. The apparatus according to claim 16, wherein the digital filtering unit comprises:
a first digital filter for filtering the derotated digital signal to generate the first filtered output signal with the first bandwidth;
a second digital filter for filtering the buffered digital signal to generate the second filtered output signal with the second bandwidth; and a third digital filter for filtering the buffered digital signal to generate the third filtered output signal with the third bandwidth.

18. The apparatus according to claim 16, wherein when the receiving apparatus is in a first mode, the signal detection circuit provides the digital signal processor with the first filtered output signal and the second filtered output signal for detection of a pilot signal.

19. The apparatus according to claim 18, wherein when the receiving apparatus is in a second mode, the signal detection circuit provides the digital signal processor with the second filtered output signal and the third filtered output signal for detection of at least a signal other than the pilot signal.

20. The apparatus according to claim 19, wherein the pilot signal is for synchronization.

21. The apparatus according to claim 20, wherein the apparatus is compliant with global system for mobile communications (GSM).

22. The apparatus according to claim 16, wherein the second bandwidth and the third bandwidth are wider than the first bandwidth.

23. The apparatus according to claim 16, wherein the first component and the second component are an in-phase component and a quadrature component of the digital signal, respectively.

* * * * *